(12) United States Patent
Adsett

(10) Patent No.: US 12,541,334 B2
(45) Date of Patent: Feb. 3, 2026

(54) PORTABLE DYNAMIC DISPLAY APPARATUS

(71) Applicant: Julian Adsett, Surfers Paradise (AU)

(72) Inventor: Julian Adsett, Surfers Paradise (AU)

(73) Assignee: Julian Adsett, Surfers Paradise (AU)

( * ) Notice: Subject to any disclaimer, the term of this patent is extended or adjusted under 35 U.S.C. 154(b) by 0 days.

(21) Appl. No.: 17/616,528

(22) PCT Filed: Jun. 5, 2020

(86) PCT No.: PCT/AU2020/050569
§ 371 (c)(1),
(2) Date: Dec. 3, 2021

(87) PCT Pub. No.: WO2020/243784
PCT Pub. Date: Dec. 10, 2020

(65) Prior Publication Data
US 2022/0236940 A1 Jul. 28, 2022

(30) Foreign Application Priority Data

Jun. 5, 2019 (AU) .............................. 2019901939

(51) Int. Cl.
G06F 1/16 (2006.01)
A61B 5/00 (2006.01)
(Continued)

(52) U.S. Cl.
CPC .......... *G06F 3/1423* (2013.01); *G06F 1/1656* (2013.01); *G09F 9/33* (2013.01);
(Continued)

(58) Field of Classification Search
CPC ........ G06F 3/1423; G06F 1/1656; G09F 9/33; G09F 21/00; G09F 2027/001;
(Continued)

(56) References Cited

U.S. PATENT DOCUMENTS 4,989,291 A * 2/1991 Parent ................... A47L 9/0063
15/339
5,966,696 A * 10/1999 Giraud ................... G06Q 30/02
235/383
(Continued)

FOREIGN PATENT DOCUMENTS

| CN | 101689340 A | 3/2010 |
| CN | 103500541 A | 1/2014 |

(Continued)

OTHER PUBLICATIONS

International Search Report in PCT/AU2020/050569, mailed Aug. 24, 2020, 8 pages.
(Continued)

*Primary Examiner* — Douglas Wilson
(74) *Attorney, Agent, or Firm* — Kilpatrick Townsend & Stockton LLP

(57) ABSTRACT

A portable display apparatus and system are provided that is not limited to placement by the presence of mains power and avoids mains power leads that may pose a tripping hazard. The portable display apparatus comprises: a self-standing housing; a digital display screen mounted to the housing and viewable from an outside of the housing; and a rechargeable battery provided in the housing, wherein the rechargeable battery is configured to power the digital display screen to thereby enable the digital display screen to display media thereon.

19 Claims, 4 Drawing Sheets

(51) Int. Cl.
| | |
|---|---|
| *G06F 3/14* | (2006.01) |
| *G06Q 30/0241* | (2023.01) |
| *G06V 40/16* | (2022.01) |
| *G09F 9/33* | (2006.01) |
| *G09F 13/04* | (2006.01) |
| *G09F 13/18* | (2006.01) |
| *G09F 13/22* | (2006.01) |
| *G09F 21/00* | (2006.01) |
| *G09F 27/00* | (2006.01) |
| *H01R 13/52* | (2006.01) |
| *H04N 21/414* | (2011.01) |
| *H04W 4/23* | (2018.01) |
| *H04W 4/38* | (2018.01) |
| *G09F 21/04* | (2006.01) |

(52) U.S. Cl.
CPC .............. *G09F 21/00* (2013.01); *A61B 5/742* (2013.01); *G06Q 30/0241* (2013.01); *G06T 2207/30242* (2013.01); *G06V 40/16* (2022.01); *G09F 13/0413* (2013.01); *G09F 2013/1881* (2013.01); *G09F 13/22* (2013.01); *G09F 2013/222* (2013.01); *G09F 21/04* (2013.01); *G09F 27/00* (2013.01); *G09F 2027/001* (2013.01); *G09F 27/005* (2013.01); *G09G 2370/16* (2013.01); *G09G 2380/06* (2013.01); *H01R 13/52* (2013.01); *H04N 21/41415* (2013.01); *H04W 4/23* (2018.02); *H04W 4/38* (2018.02)

(58) Field of Classification Search
CPC ........ G09F 27/00; G09F 27/005; G09F 21/04; G09F 13/0413; G09F 13/22; G09F 2013/1881; G09F 2013/222; G09F 7/002; A61B 5/742; G06Q 30/0241; G06Q 30/0267; G06T 2207/30242; G06V 40/16; H04N 21/41415; H04N 7/188; G09G 2380/06; G09G 2370/16; H01R 13/52; H04W 4/23; H04W 4/38
See application file for complete search history.

(56) References Cited

U.S. PATENT DOCUMENTS

| | | | |
|---|---|---|---|
| 9,545,878 B2* | 1/2017 | Simmons | G09F 27/00 |
| 9,785,632 B1* | 10/2017 | Beaven | G06T 3/02 |
| 2005/0073534 A1* | 4/2005 | Lee | G09F 9/35 345/905 |
| 2007/0070057 A1* | 3/2007 | Sanoner | G09F 7/002 345/211 |
| 2008/0264731 A1* | 10/2008 | Mangini | B66B 1/463 187/382 |
| 2008/0294475 A1 | 11/2008 | Zenor et al. | |
| 2009/0158628 A1 | 6/2009 | Ashley | |
| 2013/0085822 A1* | 4/2013 | Azami | G06Q 30/02 705/14.4 |
| 2014/0223327 A1* | 8/2014 | Mantripragada | G09F 27/005 715/744 |
| 2016/0086229 A1* | 3/2016 | Walker | A47F 5/0025 705/14.64 |
| 2017/0132960 A1 | 5/2017 | Kis-Benedek Pinero et al. | |
| 2018/0068536 A1 | 3/2018 | Green | |
| 2018/0357681 A1* | 12/2018 | Sullivan | G06F 1/1647 |
| 2019/0058912 A1 | 2/2019 | Sinohara et al. | |
| 2019/0138258 A1 | 5/2019 | Cope et al. | |
| 2021/0360201 A1* | 11/2021 | Hu | H04N 23/61 |

FOREIGN PATENT DOCUMENTS

| | | |
|---|---|---|
| CN | 204303286 U | 4/2015 |
| CN | 106486011 A | 3/2017 |
| KR | 20150056956 A | 5/2015 |

OTHER PUBLICATIONS

Search Report, CN Application No. 202080045711.4, dated Jul. 1, 2023, 8 pages.

Search Report, EP Application No. 20 818 080.2, dated May 9, 2023, 8 pages.

* cited by examiner

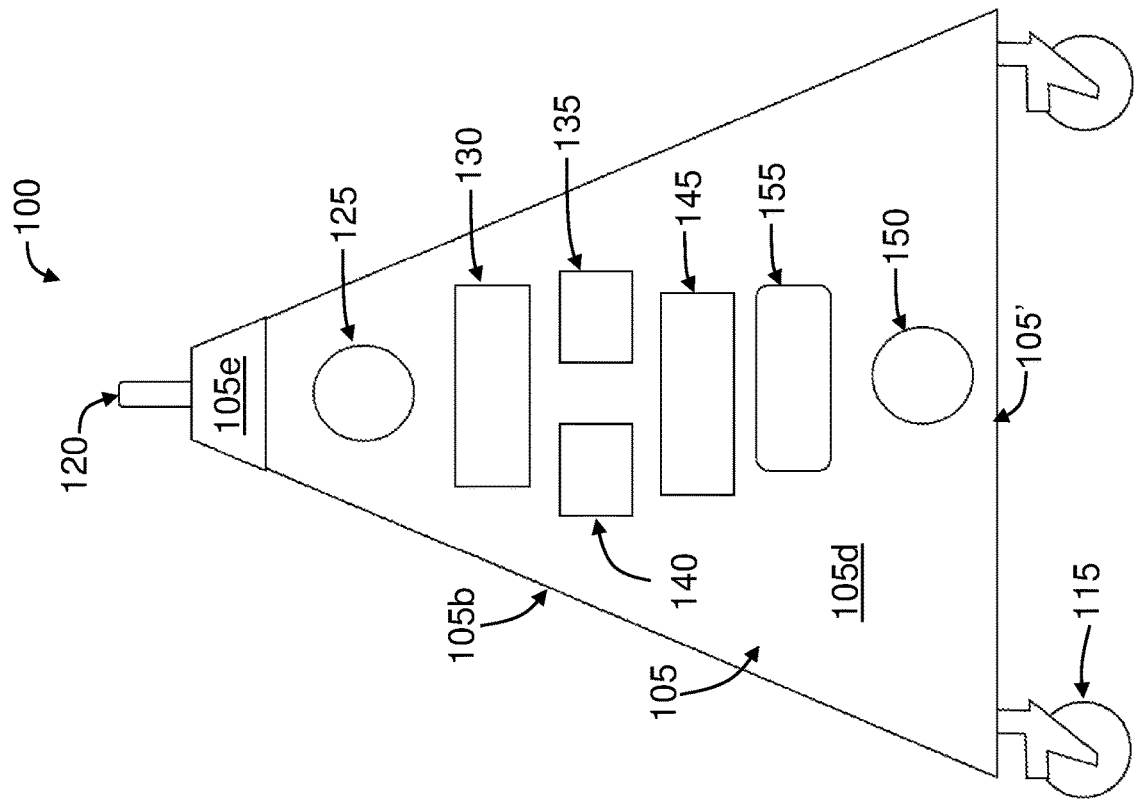
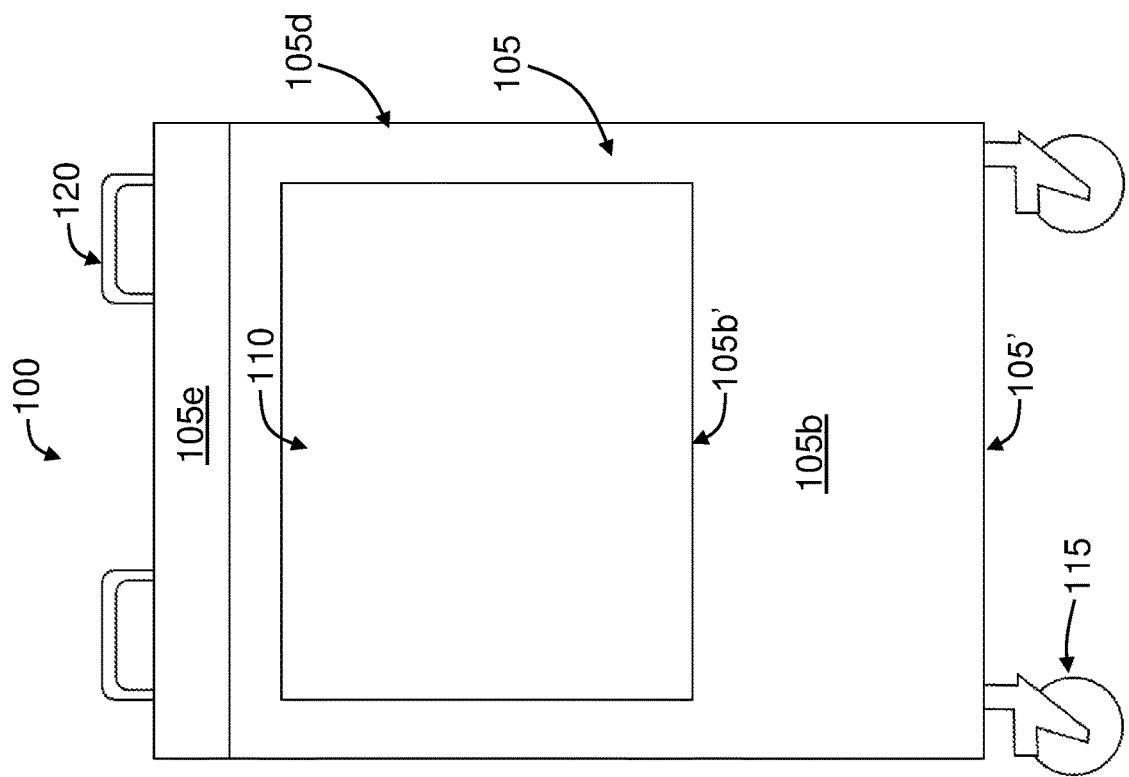

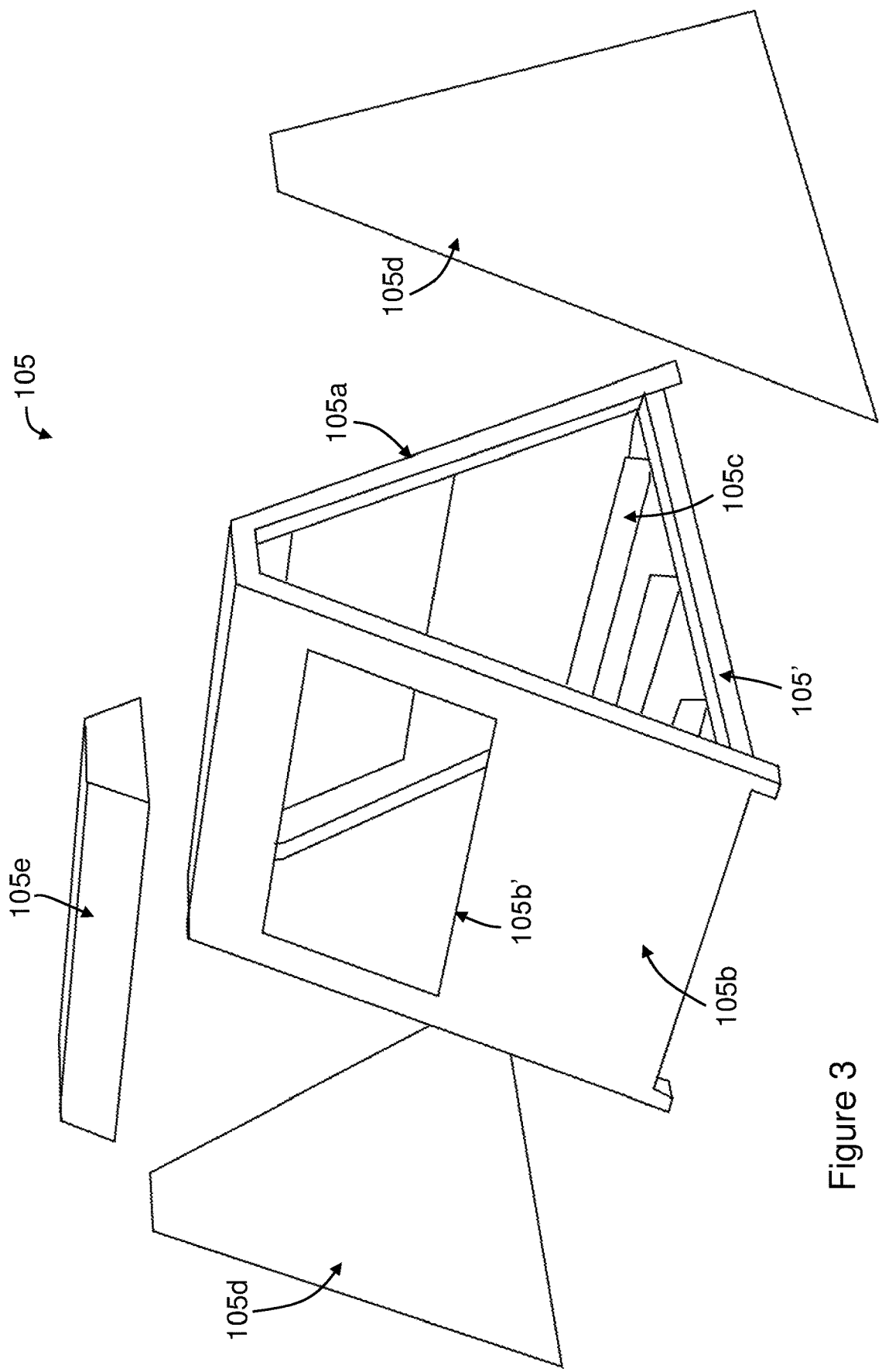

PORTABLE DYNAMIC DISPLAY APPARATUS

TECHNICAL FIELD

The present invention relates to display apparatus and systems, and in particular, although not exclusively, to portable, electronic advertising display systems.

BACKGROUND ART

A-frames are commonly used for advertising and signage, as they are a simple, safe (stable) and inexpensive way of communicating information to persons who pass by. These A-frames are particularly common in car parks, stadiums and shopfront foot paths, for both advertising and for providing information.

An A-frame typically has two display faces, which are hinged to enable the faces of the A-frame to collapse together for transport. The display faces may comprise a chalk or white board on which an owner thereof may write messages. Printed graphics are, however, now more commonly used as they are generally better at conveying messages to passers by.

A problem with A-frames of the prior art is that they are generally difficult to update. In the case of a chalk or white board, it is time consuming to write messages in an aesthetically pleasing manner. In the case of printed graphics, display faces of the A-frame must generally be replaced.

More recently, light-emitting diode (LED) display screens have been used for advertising as these provide great flexibility in how advertising and messages may be displayed, and may be used to easily show different messages over time. The use of such LED displays is, however, much more limited than A-frames given that they require power. Furthermore, the use of such displays outdoors is particularly problematic, not least because such displays are generally flat thus not easily installed in windy environments.

As such, LED display screens are often provided for permanent or semi-permanent installation, e.g. on a wall, or on a purpose-built support. This significantly limits the use of these screens and increases costs associated with the installation of such LED display screens. As an illustrative example, a static (permanent or semi-permanent) installation has significant visual limitations over an A-frame, which may be moved around as desired.

As such, there is clearly a need for an improved display apparatus and system.

It will be clearly understood that, if a prior art publication is referred to herein, this reference does not constitute an admission that the publication forms part of the common general knowledge in the art in Australia or in any other country.

SUMMARY OF INVENTION

The present invention is directed to display apparatus and systems, which may at least partially overcome at least one of the abovementioned disadvantages or provide the consumer with a useful or commercial choice.

In one form, the invention resides broadly in a portable display apparatus comprising:
   a self-standing housing;
   a digital display screen mounted to the housing and viewable from an outside of the housing; and
   a rechargeable battery provided in the housing, wherein the rechargeable battery is configured to power the digital display screen to thereby enable the digital display screen to display media thereon.

Advantageously, the display apparatus includes a rechargeable battery for powering the display screen, and therefore does not require mains power to power the display screen. This simplifies placement of the display apparatus, and avoids mains power leads that may pose a tripping hazard.

Preferably, the battery is provided in a base of the housing. By providing the rechargeable battery in the base of the housing ensures that the housing has a low centre of gravity, which may in turn reduce a chance of the portable display apparatus falling over.

Preferably, the housing is substantially enclosed. Advantageously, such configuration may prevent the housing from catching the wind, unlike a planar display panel which may catch wind like a sail.

Preferably, the housing is a substantially weatherproof. Suitably, the housing is waterproof enabling the display apparatus to be used in the rain.

Preferably, a viewing surface of the digital display screen may comprise, or be in close proximity to, an outer surface of the housing. A protective, transparent cover, such as an acrylic or polycarbonate cover, may protect the display screen from physical damage.

Preferably, the base of the housing is wider than an upper portion of the housing in at least one dimension.

Preferably, the housing is substantially triangular in cross section. The housing may comprise an inclined surface. The housing may comprise first and second inclined surfaces. The first and second inclined surfaces may be inclined in opposite directions. The housing may be substantially symmetrical. The first and second inclined surfaces may be angled towards each other at an acute angle. Suitably, the housing comprises an A-frame.

The housing may be substantially defined by planar panels.

The display apparatus may include first and second digital display screens. The first and second display screens may be on opposing sides of the housing. The first and second display screens may be angled towards each other at an acute angle.

Preferably, the housing includes one or more wheels to simplify movement of the display apparatus. The wheels may be lockable.

Preferably, the display apparatus comprises a wireless data interface, configured to enable media to be displayed on the display screen to be updated wirelessly.

The wireless data interface may include a WiFi and/or a cellular data interface (e.g. 4G). The wireless data interface may provide Internet connectivity to the display apparatus.

The display apparatus may include a unique identifier, wherein the media to be displayed on the display screen is updateable using the unique identifier. Such configuration enables a user to easily select which display apparatus, of potentially many display apparatus, are to be updated.

The display apparatus may be configured to retrieve media to be displayed on the display screen, from a remote server. The display apparatus may be configured to retrieve the media according to a URL. The display apparatus may be configured to retrieve the media according to a unique identifier associated with the display apparatus. The display apparatus may be configured to retrieve media periodically.

The display apparatus may include one or more sensors, configured to capture data relating to its surroundings. The display apparatus may be configured to upload captured sensor data to a central server. The display apparatus may be configured to share captured sensor data with other display apparatus.

The sensors may include environmental sensors (e.g. temperature and/or humidity sensors).

The display apparatus may be configured to generate media, for display, according to the captured sensor data. As an illustrative example, the display apparatus may be configured to display an ambient temperature or a humidity detected by the sensors.

The sensors may include image capture sensors, such as cameras. The display apparatus may be configured to upload image data, captured by the sensors, to a server. The display apparatus may enable remote viewing from the display apparatus. The image data may comprise still images or video. The cameras may include an associated microphone, or a standalone microphone may be provided.

The sensors may include people/traffic counters, configured to count people.

The sensors may include a light sensor. The display apparatus may be configured to brighten or darken the display screen according to sensor data from the light sensor. Such configuration enables battery power to be saved, as the screen is not unnecessarily bright.

The display apparatus may include one or more speakers, configured to emit sound. The sound may correspond to an image or video on the display. The sound may be configured to attract attention (e.g. a ding or bell). Similarly, the speaker can provide stand-alone information, such as alerting customers of closing hours for a car park, or notifying passengers of a change of terminal in an airport, potentially in multiple languages.

The display apparatus may include one or more microphones.

The display apparatus may be configured to communicate with one or more other display apparatus. The display apparatus may be configured to receive data from one or more other display apparatus.

The display apparatus may be motion activated. The display apparatus may enter a low power mode when motion is not detected, and a normal power mode when motion is detected. Functionality of the display apparatus may be activated when motion is detected.

In another form, the invention resides broadly in a system comprising a plurality of portable display apparatus in communication with a computing device, wherein each of the portable display apparatus is configurable by the computing device.

The computing device may be in communication with each of the portable display apparatus by the Internet.

The plurality of portable display apparatus may work together. As an illustrative example, a counter may be provided on each of the portable display apparatus, wherein each of the portable display apparatus displays an aggregated count from each of the individual counters. Similarly, one display may be configured to count people entering an area, and another to count people leaving an area, wherein one display is configured to display the difference between the two (being the number of people in the area).

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which:

FIG. 1 illustrates a front view of a portable display apparatus, according to an embodiment of the present invention.

FIG. 2 illustrates a side view of the portable display apparatus of FIG. 1.

FIG. 3 illustrates an exploded view of a portion of a housing of the portable display apparatus of FIG. 1.

Figure 4:
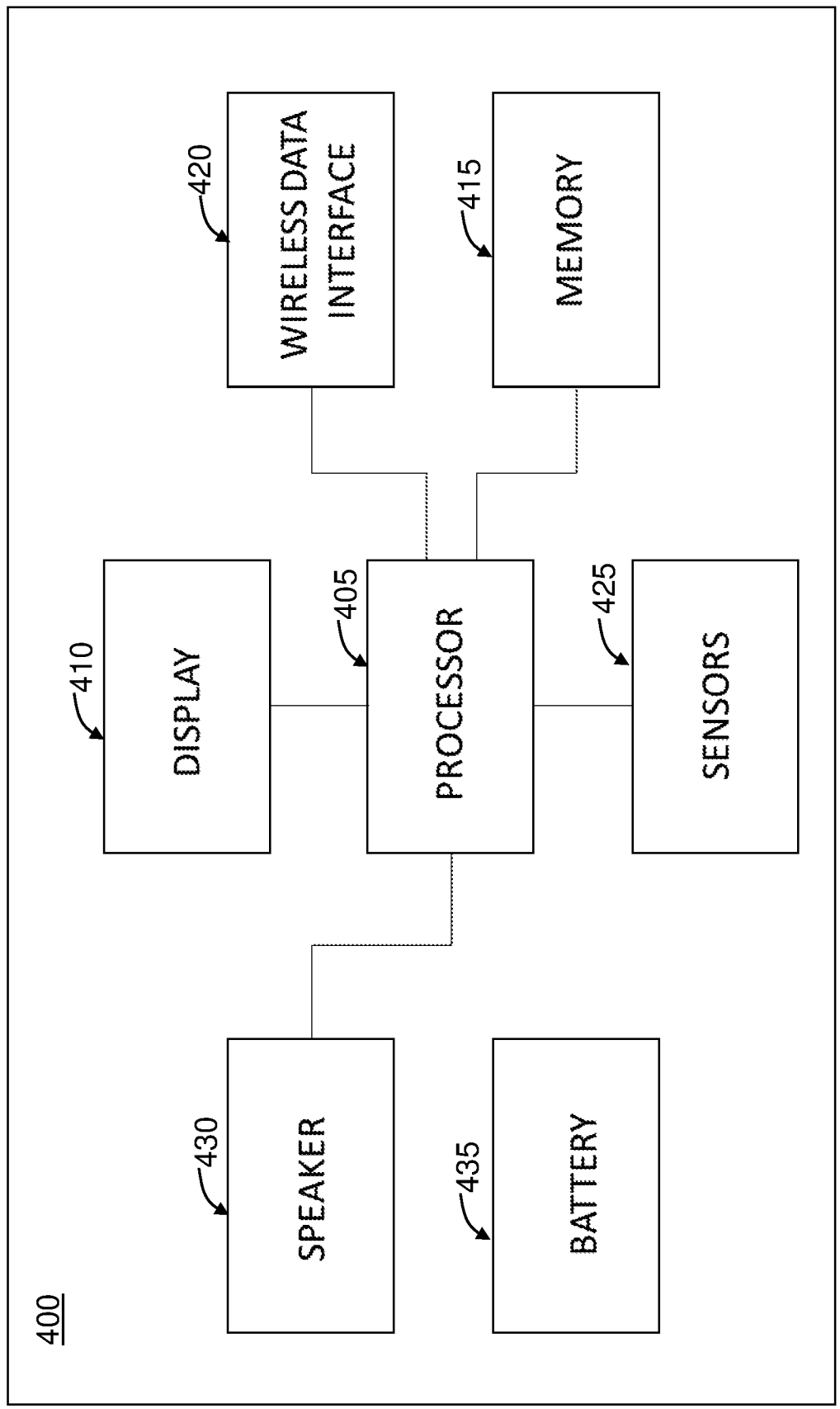
FIG. 4 illustrates a simplified schematic of a portable display apparatus, according to an embodiment of the present invention.

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

DESCRIPTION OF EMBODIMENTS

FIG. 1 illustrates a front view of a portable display apparatus 100, according to an embodiment of the present invention. FIG. 2 illustrates a side view of the portable display apparatus 100. The portable display apparatus 100 provides a simple, safe and effective means of communicating information, such as advertising, as outlined below.

The portable display apparatus 100 comprises a self-standing housing 105, in which digital display screens 110 are mounted, such that the screens 110 are viewable from an outside of the housing 105. As such, the portable display apparatus 100 is able to function much like an A-frame display, but with electronic display screens.

FIG. 3 illustrates an exploded view of a portion of the housing 105, which comprises interconnected frame members 105*a*, with inclined surfaces 105*b* attached thereto. The first and second inclined surfaces 105*b* are inclined in opposite directions, to define a housing 105 that is substantially triangular in cross section.

Each of the inclined surfaces 105*b* includes a rectangular window portion 105*b*' defined therein, through which a corresponding display screen 110 is visible. In particular, a digital display screen 110 is mounted to an inside of the frame such that a viewing surface of the digital display screen 110 is immediately adjacent to the window portion 105*b*', thereby closing the window portion 105*b*'.

A protective, transparent cover (not illustrated), such as an acrylic or polycarbonate cover (e.g. Perspex), may be provided in front of the digital display screen 110 to protect the display screen from physical damage. In such case, the transparent cover may be used to seal the window portions 105*b*' in a waterproof (or water resistant) manner.

The skilled addressee will readily appreciate that any suitably sized window may be used, from a relatively small window (for a small screen), to a window that takes up almost an entire side of the display apparatus 100. Similarly, advertising or other information may be provided adjacent to the windows.

A base 105' of the housing 105 is wide (and wider than an upper portion of the housing 105), and defines battery receiving channels 105*c*, for receiving one or more rechargeable batteries therein, and thus in the base 105' of the housing 105. The channels 105c are useful in securing the batteries, and thereby ensuring that the batteries do not move within the housing 105, even if the housing 105 is tilted.

The rechargeable batteries are configured to power the digital display screens 110 to thereby enable the digital display screen to display media thereon. As such, the portable display apparatus 100 does not require mains power to power the display screens 110. This simplifies placement of the display apparatus 100, and avoids mains power leads that may pose a tripping hazard. In short, the portable display apparatus 100 may be used where a traditional A-frame sign may be used.

Furthermore, by providing the rechargeable batteries in the base 105' of the housing 105 ensures that the housing 105 has a very low centre of gravity, which, together with the wide base 105', reduces a chance of the portable display apparatus 100 falling over, even if bumped.

First and second side panels 105d are coupled to opposing sides of the housing 105 and may be removed to gain access to an inside of the housing 105 (e.g. to install or replace the batteries). Finally, a topping cap 105e is provided at a top of the housing 105. The topping cap 105e functions to provide rigidity to the housing, and provides a water resistant upper surface.

When the first and second side panels 105d are installed, and the display screens 110 are in place, the housing 105 is substantially enclosed and is substantially weatherproof. This not only protects electronics inside the housing 105 from the weather, and enabling the display apparatus 100 to be used in the rain, but may also prevent the housing 105 from catching the wind, unlike a planar display panel which may catch wind like a sail.

While not illustrated in FIG. 3, the housing 105 includes wheels 115 in each of the four corners of the base 115', to simplify movement of the display apparatus (as it may be rolled into place rather than carried). The wheels 115 are lockable, keeping the portable display apparatus 100 in place.

Similarly, and again not illustrated in FIG. 3, the housing 105 includes handles 120 at the topping cap 105e, to provide grip to assist in manoeuvring the portable display apparatus 100. The handles may also be used to secure the portable display apparatus 100 to another object or thing, e.g. using a chain and lock.

The housing 105 is defined by frame members 105a comprising aluminium box section, on which planar aluminium sheet members are attached (e.g. by welding or other fastening). The housing 105 is substantially defined by these planar sheet members (panels), which provides a strong and lightweight housing. In particular, the sheet members reinforce the frame members 105a.

The housing 105 houses electronics which provide functionality to the display screens, including the ability to update media (content) for display on the display screen, as well as a variety of other functionality, as outlined below.

FIG. 4 illustrates a simplified schematic of a portable display apparatus 400, according to an embodiment of the present invention. The portable display apparatus 400 may be similar or identical to the portable display apparatus 100.

The portable display apparatus 400 includes a processor 405 coupled to a display 410. The processor 405 is configured to define what is to be displayed on the display, enabling different things to be displayed at different times.

A memory 415 is coupled to the processor 405, and includes instruction code executable by the processor for performing functions of the display apparatus. The memory may further include graphics, images or video, for display on the display 410.

The portable display apparatus 400 further includes a wireless data interface 420, coupled to the processor 405. The wireless data interface 420 may include a WiFi and/or a cellular data interface (e.g. 4G), and enables the portable display apparatus 400 to communicate with computing devices, and/or other display apparatus 400. In particular, the wireless data interface enables remote configuration of the portable display apparatus 400 including update of the display 410.

A plurality of sensors 425 is coupled to the processor 405 and are configured to capture data relating to the surroundings of the portable display apparatus. The sensors 425 include environmental sensors, such as temperature and/or humidity sensors, to capture environmental data relating to the environment of the portable display apparatus 400.

The processor 405 may be configured to generate media, for display on the display 410, according to the captured sensor data. As an illustrative example, the display apparatus may be configured to display an ambient temperature or a humidity detected by the sensors, so that passers by may see the ambient temperature and/or humidity levels.

The sensors 425 may also include image capture sensors, such as cameras. The processor 405 may be configured to cause image data (e.g. still images or video) to be uploaded to a server using the wireless data interface. The display apparatus 400 may also enable on-demand remote viewing from the display apparatus.

The sensors 425 may include a thermal camera, or virtual thermometer, configured to capture a temperature of persons passing by, such that an alert may issue should a person's temperature be above a particular threshold. Such configuration is useful during pandemic, such as the recent Covid-19 pandemic, as it enables persons having high temperatures to be identified automatically. Similarly, the sensors 425 may sense other physiological characteristics of persons, including heart-rate, rate of breathing, or any other suitable physiological characteristic(s).

Furthermore, the sensors 425 may include people/traffic counters, configured to count people, e.g. passing the portable display apparatus or entering or leaving an area. Such information may also be uploaded to a server using the wireless data interface 420, or used locally at the portable display apparatus 400. As an illustrative example, messages may be displayed on the display 410 until a certain number of person are counted, and then updated.

Yet further again, the sensors 425 may include a light sensor, configured to capture ambient light levels surrounding the portable display apparatus 400. The processor 405 may cause the display 410 to brighten or darken according to sensor data from the light sensor. Such configuration enables battery power to be saved, and improves aesthetics, as the screen is not unnecessarily bright.

The sensors 425 may include motion sensors. The display apparatus may be motion activated. The display apparatus may enter a low power mode when motion is not detected, and a normal power mode when motion is detected. Functionality of the display apparatus may be activated when motion is detected.

Finally, the sensors 425 may include one or more anti-theft sensors. As an illustrative example, the sensors may include an inclination and motion sensor, to detect unauthorised movement of the display. In case unauthorised motion is detected, an alarm may sound, and an alert may be sent wirelessly to a user device. Image data may be captured and uploaded with a view of identifying any perpetrators.

The portable display apparatus 400 include a speaker 430, configured to emit sound. The sound may correspond to an image or video on the display, or may be configured to attract attention (e.g. using a ding or bell sound).

Finally, the portable display apparatus 400 includes a rechargeable battery 435, configured to power the portable display apparatus 400. The use of a rechargeable battery alleviates the need to use mains power to power the portable display apparatus 400, which provides greater flexibility in where the apparatus 400 may be used.

The skilled addressee will readily appreciate that the portable display apparatus 400 is illustrated in a simplified manner for the sake of clarity, and will generally include a variety of other components, including data ports, charging ports, switches, wiring, charging circuitry, inverters, transformers, step-up and step-down voltage regulators, wiring, circuitry, connectors and the like.

Furthermore, the portable display apparatus 400 may be updated to include a variety of other features or elements, as desired. As an illustrative example, the portable display apparatus may include a solar panel, coupled to and configured to charge the batteries.

Similarly, the components are described in general terms, but may take any suitable number of forms. As an illustrative example, the display 410 may comprise an LED dot matrix display. Similarly, the memory may comprise a variety of memory types, including a combination of memory types (e.g. memory of a graphics card or graphics memory, transitory memory such as RAM, and non-transitory memory, such as a hard drive).

Now turning back to FIG. 2, the housing 105 includes a variety of ports and apertures to enable the components therein to function. In the apparatus 100, these are all provided on one side panel 105d, but in other embodiments may be provided in any suitable location.

The housing 105 includes speaker perforations 125 defined in the side panel 105d, to enable sound from a speaker mounted in association thereto to efficiently emit sound from the portable display apparatus.

The perforations 125 may be stamped in the panel 105d, and a mesh, such as a waterproof mesh, may be provided in association with the perforations.

A sensor array 130 is provided immediately below the speaker perforations 125, and incorporates the sensors of the portable display apparatus 100. As outlined above, the sensors can include cameras, person counters, a thermometer, a humidity sensor, but can include any suitable sensor.

The sensor array 130 may enable a user to direct the sensors, e.g. through a pivot joint or mechanism. Alternatively, the sensor array may be configurable to focus in a particular direction.

In addition to being able to remotely configure the portable display apparatus 100 through a wireless interface, an ethernet socket 135 and a USB socket 140 is provided to provide local, cabled interfaces. This is particularly useful when the portable display apparatus 100 is being configured for the first time, or substantial software updates are being provided.

A bay of switches 145 are provided on the panel 105d, which enable the portable display apparatus 100 to be turned on and off, as well as each of the screens 110 individually. A secure cover may be provided in relation to the switches 145, to prevent an unauthorised person from turning off the display apparatus 100.

A mains power port 150 is provided to enable the batteries to charge, and a charging controller 155 is provided in association thereto. The charging controller 155 includes status lights, to enable a user to see a charging state of the batteries.

Any suitable combination of batteries and charging controllers may be used, but in one embodiment the batteries are dimensioned to provide approximately 18 hours of power, with a recharge time of about 6 hours or less. As a result, the portable display apparatus 100 may be used daily for about 18 hours per day.

While the above embodiments describe a display apparatus, configured to communicate information to passers by, in other embodiments, the apparatus may be interactive, enabling passers by to enter data. As an illustrative example, the display may comprise a touch screen display with which users may interact.

In such case the display apparatus may function as an information kiosk, where users may interact with the display apparatus to obtain information. The information could be categorised according to a menu, where the user is able to select an option of a plurality of options to make a selection. Similarly, the information may be dynamically updated based upon time of day. As an illustrative example, the display apparatus may function as an information kiosk at a festival, showing what is on in each of a plurality of stages. The information kiosk may be interactive enabling the user to get more information. While this scenario is particularly suited to a touch screen, any other type of user input may be used.

As outlined above, the wireless data interface 420 enables the portable display apparatus 100, 400 to communicate with a central server and/or other display apparatus 100, 400.

Figure 5:
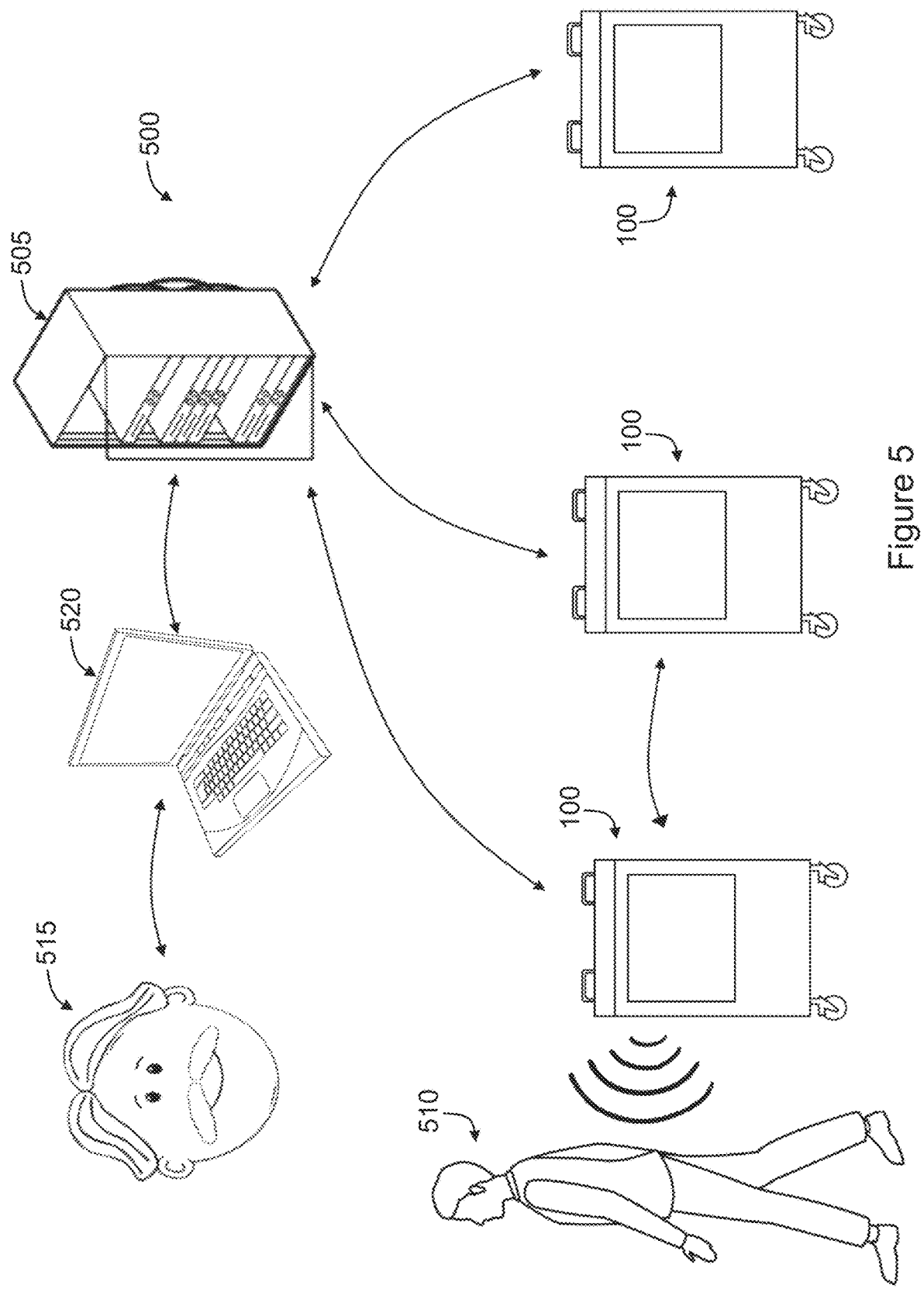
FIG. 5 illustrates a display system including a plurality of portable display apparatus, according to an embodiment of the present invention.

FIG. 5 illustrates a display system 500 including a plurality of portable display apparatus 100, according to an embodiment of the present invention. The display apparatus 100 are configured to communicate with one or more other display apparatus 100, and to communicate with a remote server 505 by the Internet.

As outlined above, the display apparatus 100 include a plurality of sensors, which are configured to collect data relating to the surroundings. As an illustrative example, a display apparatus 100 may capture data relating to persons 510 in proximity to the display apparatus 100. Such data may include simply measuring the presence of the persons 510, e.g. using a counter, all the way to identifying the person, e.g. using physical characteristics of the person (such as facial recognition) or a device associated with the person (such as a smartphone).

The display apparatus 105 may send details of the person to the server 505 for further processing. This may include logging the presence of the person (or number of persons generally), and may include characteristics of the person or a device associated with the person.

An administrator 515 is able to log onto the server 505 using a computing device 520, such as a laptop computer. The server 505 may include a web interface, whereby data of the server is accessible through a webpage. As such, the administrator 515 is able to gather data and statistics from each of the plurality of display apparatus 100.

The administrator 515 is further able to update each of the display apparatus 100, such as content which is to be displayed thereon. This may be done individually, using an identifier associated with one of the display apparatus 100, or as a group. This may be ultimately achieved in a variety of ways. In one embodiment, the display apparatus 100 may be configured to retrieve media to be displayed on the display screen, from the remote server 505, e.g. using a URL or a unique identifier associated with the display apparatus 100. As such, the administrator 515 is able to update content on the server 505, and thereby update content displayed on the display apparatus 100.

The display apparatus 100 may be configured to receive data from one or more other display apparatus 100. As an illustrative example, a first display apparatus 100 may capture identifying data of a person 510, and provide that to a second display apparatus 100. The second display apparatus 100 may then attempt to identify whether the same person 510 is in proximity to the second display apparatus. Such configuration may be able to track movement of persons across a large number of display apparatus 100 which may be located in a relatively broad geographic region.

Furthermore, the plurality of portable display apparatus 100 may work together. As an illustrative example, a counter may be provided on each of the portable display systems, wherein each of the portable display systems displays an aggregated count from each of the individual counters. Such configuration may be useful in a stadium, where a display apparatus 100 is positioned at each entry to count persons entering the stadium, but where an aggregate number of persons (e.g. the total number of persons in the stadium) is counted.

Similarly, one display apparatus 100 may be configured to count people entering an area, and another to count people leaving an area, wherein one display is configured to display the difference between the two (being the number of people in the area). In such case, the display apparatus 100 may display when an area has reached capacity. Such configuration may also be adapted to count vehicles, to let drivers know when a car park is full.

In addition to be able to be configured to display particular media, the display apparatus may be configured to display different media or content depending on one or more criteria, or in a sequence. As an illustrative example, different media may be played depending on time of day. In another example, different media may be played depending on ambient temperature. In yet another example, different media (e.g. different languages) may be played in a particular sequence.

Advantageously, the display apparatus described above provide a simple, safe and effective means for communicating messages, such as advertising. As they do not require mains power to power the display screen, placement of the display apparatus is greatly simplified, and mains power leads that may pose a tripping hazard are avoided. Furthermore, by providing the rechargeable battery in the base of the housing ensures that the housing has a low centre of gravity, which may in turn reduce a chance of the portable display apparatus falling over.

Furthermore, the display systems and apparatus described above may incorporate varying levels of intelligence, which enables the information displayed thereon to be updated in a more intelligent manner, but also enables data gathering. Furthermore, the coordination of multiple display apparatus enables complex data to be captured and considered as a whole, including movements across areas, and data from multiple distinct areas.

Advantageously, a display of the display apparatus may be updated without requiring physical contact with the display apparatus, which is more efficient. Multiple display apparatus may be updated simultaneously and remotely, which is useful when information is to be updated without warning, e.g. in an emergency situation.

The display apparatus have wide applicability, from airports to car parks, stadiums and shop front foot paths. However, the skilled addressee will readily appreciate that the display apparatus may be used in any suitable location where information is to be conveyed.

As the display apparatus are able to be updated in real time, they may provide up to date information to the public such as road closures and accident information, and even provide alternative detour routes. Similarly, several display apparatus may be used together to give direction (guide) a person.

Furthermore, in the case of events and stadiums, when seating becomes full direction to available seating can be updated and provided in real time. Similarly when tickets are sold out, or seating is full, information can be provided at an early stage to avoid disappointment.

Finally, the display apparatus are able to gather statistics and other data for analysis. As an illustrative example, a retailer may use the system to determine a ratio of persons in proximity to the retailer actually come in to the retailer (e.g. enter the shop).

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A weatherproof portable display apparatus comprising:
   a self-standing substantially enclosed and weatherproof housing comprising first and second inclined surfaces, and a base extending between lower edges of the first and second inclined surfaces;
   a digital display screen mounted in and to the housing and viewable from an outside of the housing;
   one or more sensors, configured to capture data relating to surroundings of the weatherproof portable display apparatus, the one or more sensors including an image capture sensor, configured to capture image data;
   a wireless data interface, housed in the housing and coupled to the display screen and the one or more sensors, and configured to 1) enable media to be displayed on the display screen to be remotely updated 2) upload captured sensor data to a central server or a remote computing device and 3) receive sensor data from one or more other weatherproof portable display apparatus, the sensor data relating to the surroundings of the one or more other weatherproof portable display apparatus, to enable the weatherproof portable display apparatus and the one or more other weatherproof portable display apparatus to work together on one or more joint tasks;

a processor, housed in the housing and coupled to the one or more sensors, the wireless data interface and the digital display screen, the processor configured to process received sensor data relating to the surroundings of one or more other weatherproof portable display apparatus and sensor data relating to the surroundings of the weatherproof portable display apparatus to generate an output, and update the display to include the output; and a rechargeable battery provided in the base of the housing, wherein the rechargeable battery is configured to power the digital display screen to thereby enable the digital display screen to display media thereon, wherein the weatherproof portable display apparatus is sized to be positioned on the ground so that the digital display screen is readily viewable by passersby, and wherein the received sensor data includes identifying data of a person previously present in surroundings of the one or more other display apparatus, and wherein the processor is configured to determine whether the person is in proximity to the portable display apparatus using the identifying data.

2. The weatherproof portable display apparatus of claim 1, wherein a viewing surface of the digital display screen comprises, or is in close proximity to, an outer surface of the housing.

3. The weatherproof portable display apparatus of claim 1, wherein a base of the housing is wider than an upper portion of the housing in at least one dimension.

4. The weatherproof portable display apparatus of claim 1, wherein the first and second inclined surfaces are angled towards each other at an acute angle.

5. The weatherproof portable display apparatus of claim 1, wherein the weatherproof portable display apparatus includes first and second digital display screens on opposing sides of the housing.

6. The weatherproof portable display apparatus of claim 1, wherein the weatherproof portable display apparatus includes a unique identifier, where the media to be displayed on the display screen is remotely updateable using the unique identifier.

7. The weatherproof portable display apparatus of claim 1, wherein the weatherproof portable display apparatus is configured to retrieve media to be displayed on the display screen, from a remote server.

8. The weatherproof portable display apparatus of claim 1, wherein the weatherproof portable display apparatus is configured to capture sensor data with other display apparatus.

9. The weatherproof portable display apparatus of claim 1, wherein the weatherproof portable display apparatus is configured to generate media, for display, according to captured sensor data.

10. The weatherproof portable display apparatus of claim 1, wherein the sensors include image capture sensors, and where the weatherproof portable display apparatus is configured to upload image data, captured by the sensors, to a server or remote computing device.

11. The weatherproof portable display apparatus of claim 10, wherein the image capture sensors comprise cameras.

12. The weatherproof portable display apparatus of claim 1, wherein the sensors include people/traffic counters, configured to count people.

13. The weatherproof portable display apparatus of claim 1, wherein the sensors include a light sensor, wherein the weatherproof portable display apparatus is configured to brighten or darken the display screen according to sensor data from the light sensor.

14. A system comprising a plurality of weatherproof portable display apparatus according to claim 1 in communication with a computing device, wherein each of the weatherproof portable display apparatus is configurable by the computing device.

15. The system of claim 14, wherein the plurality of weatherproof portable display apparatus each include sensors, and wherein two or more of the plurality of weatherproof portable display apparatus work together on a task.

16. The system of claim 14, wherein a first weatherproof portable display apparatus of the plurality of weatherproof portable display apparatus is configured to receive identifying data comprising identifying characteristics of a person from another weatherproof portable display apparatus of the plurality of weatherproof portable display apparatus, and wherein the first weatherproof portable display apparatus is configured to determine whether the person is in proximity to the first weatherproof portable display apparatus at least in part according to the identifying characteristics of the person.

17. The weatherproof portable display apparatus of claim 16, wherein the first weatherproof portable display apparatus is configured to determine whether the person is in proximity to the first weatherproof portable display apparatus using facial recognition and the identifying data of the person.

18. The weatherproof portable display apparatus of claim 1, wherein the housing is an A-frame having first and second inclined surfaces that are inclined in opposite directions, the display being a first display mounted on or in the first inclined surface and further comprising a second display mounted on or in the second inclined surface so that the first and second displays are readily viewable to passersby from each direction.

19. The weatherproof portable display apparatus of claim 18, wherein the weatherproof portable display apparatus further comprises one or more handles disposed at a top of the housing to provide grip to assist in maneuvering the weatherproof portable display apparatus by a user.

\* \* \* \* \*